US012559590B2

(12) United States Patent
Jiang et al.

(10) Patent No.: US 12,559,590 B2
(45) Date of Patent: Feb. 24, 2026

(54) POLYMER COMPOSITIONS AND POLYMERIC PLASTICIZER APPLICATIONS INCORPORATING SAME

(71) Applicant: Dow Global Technologies LLC, Midland, MI (US)

(72) Inventors: Xian Jiang, Lake Jackson, TX (US); Yushan Hu, Lake Jackson, TX (US); Wayne C. Whelchel, Wilmington, DE (US); Bruce M. Hasch, Lake Jackson, TX (US); Hayley A. Brown, Lake Jackson, TX (US); Seema V. Karande, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 461 days.

(21) Appl. No.: 18/250,867

(22) PCT Filed: Oct. 27, 2021

(86) PCT No.: PCT/US2021/056762

§ 371 (c)(1),
(2) Date: Apr. 27, 2023

(87) PCT Pub. No.: WO2022/093902

PCT Pub. Date: May 5, 2022

(65) Prior Publication Data

US 2023/0383058 A1 Nov. 30, 2023

Related U.S. Application Data

(60) Provisional application No. 63/107,837, filed on Oct. 30, 2020.

(51) Int. Cl.
*C08G 67/02* (2006.01)
*C08L 27/06* (2006.01)

(52) U.S. Cl.
CPC .............. *C08G 67/02* (2013.01); *C08L 27/06* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 3,780,140 A | 12/1973 | Hammer et al. | |
| 4,698,392 A | 10/1987 | Chou | |
| 5,278,236 A | 1/1994 | Case et al. | |
| 6,825,256 B2 | 11/2004 | Bae et al. | |
| 9,688,848 B1 | 6/2017 | Zhang et al. | |
| 2002/0042475 A1* | 4/2002 | Patil ........................ | C08L 27/06 |
| | | | 525/185 |
| 2016/0362578 A1 | 12/2016 | Reynoso Gomez et al. | |

FOREIGN PATENT DOCUMENTS

JP H05186588 A 7/1993

OTHER PUBLICATIONS

Brazilian Technical Report dated Sep. 4, 2025, pertaining to BR Patent Application No. 112023007845.8, 8 pgs.
Chinese Notification of First Office Action dated Jun. 19, 2025, pertaining to CN Patent Application No. CN2021800727847, 10 pgs.
International Search Report and Written Opinion dated Jan. 26, 2022, pertaining to Int'l Patent Application No. PCT/US2021/056762, 12 pgs.
Bernhard Wunderlich, The Basis of Thermal Analysis, in Thermal Characterization of Polymeric Materials 92, 277-278 (Edith A Turi ed., 2d ed. 1997).
Communication pursuant to Article 94(3) EPC dated Nov. 7, 2025, pertaining to EP Patent Application No. 21820738.9, 3 pgs.
Japanese Office Action dated Nov. 18, 2025, pertaining to JP Patent Application No. 2023-525014, 9 pgs.

* cited by examiner

*Primary Examiner* — Christopher M Rodd
(74) *Attorney, Agent, or Firm* — Dinsmore & Shohl LLP

(57) ABSTRACT

The present disclosure provides embodiments of a tetrapolymer composition. In embodiments, the tetrapolymer composition may have the formula E/P/X/CO, which may include from 25 wt. % to 90 wt. % of ethylene (E), from 0.1 wt. % to 5.0 wt. % of propylene (P), from 5 wt. % to 40 wt. % of alkyl acrylate (X), and from 3 wt. % to 30 wt. % of carbon monoxide (CO). X may be selected from the group consisting of vinyl acetate or n-butyl acrylate. The tetrapolymer composition may have a melt index, I2, from 10 to 1,000 g/10 min when measured according to ASTM 1238 at 2.16 kg and 190 C. Additionally, the present disclosure provides embodiments of a polymer formulation comprising the tetrapolymer composition and polyvinyl chloride.

15 Claims, No Drawings

POLYMER COMPOSITIONS AND POLYMERIC PLASTICIZER APPLICATIONS INCORPORATING SAME

CROSS-REFERENCE TO RELATED APPLICATIONS

The present application is a National Phase Entry under 35 U.S.C. § 371 of International Patent Application No. PCT/US2021/056762 filed Oct. 27, 2021, which claims priority to U.S. Provisional Patent Application No. 63/107,837 filed Oct. 30, 2020, the entireties of which are incorporated by reference herein.

TECHNICAL FIELD

Embodiments described herein generally relate to polymers and specifically relate to tetrapolymer compositions for use in plasticizer applications.

BACKGROUND

Polyvinyl chloride (PVC) is one of the most commonly used polymers. PVC polymers are vinyl halide polymers that may be further classified by their degree of rigidity as "rigid" (unplasticized) PVC polymers or "flexible" (plasticized) PVC polymers. Flexible PVC polymers are thus softer and more amenable to bending than rigid PVC polymers. Flexible PVC polymers are commonly used in construction applications as insulation on electrical wires, flooring for homes, roofing, and geomembrane applications.

SUMMARY

Conventionally, flexible PVC applications utilize PVC polymers that require a plasticizer to soften PVC enough to became flexible and elastomeric. For example, phthalate-based liquid plasticizers are commonly used plasticizers for flexible PVC applications. However, due to the small molecule nature of phthalate-based liquid plasticizers, the phthalate-based liquid plasticizer migrates out of the PVC polymer over time, which leads to deteriorating performance properties of the flexible PVC polymer.

To address the migration issue, polymeric plasticizers may applied to replace the phthalate-based plasticizer. However, studies show that polymeric plasticizers may have a lower plasticizing efficiency than conventional phthalate-based plasticizers. As a result, higher amounts of polymeric plasticizers may be required to achieve the desired softness or flexibility in the overall PVC polymer formulations.

As such, there are needs for alternative compositions with flexible and elastomeric properties that, when utilized as plasticizers in PVC polymer formulations, exhibit improved plasticizing efficiency over conventional polymeric plasticizers.

Embodiments of the present disclosure meet those needs by providing a composition comprising a tetrapolymer, which may exhibit improved flexible and elastomeric properties when compared to conventional polymeric plasticizers. As such, when utilized in flexible PVC polymer formulations, the tetrapolymer compositions described herein may allow for polymer formulations that maintain performance properties or have increased resistance to failure modes such as rutting or fatigue cracking at various temperature regimes.

According to at least one embodiment of the present disclosure, a tetrapolymer composition is provided. In embodiments, the tetrapolymer composition may have the formula E/P/X/CO, which may include from 25 wt. % to 90 wt. % of ethylene (E), from 0.1 wt. % to 5.0 wt. % of propylene (P), from 5 wt. % to 40 wt. % of alkyl acrylate (X), and from 3 wt. % to 30 wt. % of carbon monoxide (CO). X may be selected from the group consisting of vinyl acetate or n-butyl acrylate. The tetrapolymer composition may have a melt index, $I_2$, from 10 to 1,000 g/10 min when measured according to ASTM 1238 at 2.16 kg and 190° C.

According to at least one embodiment of the present disclosure, polymer formulations are provided, which may be utilized in flexible PVC applications. Embodiments of a polymer formulation may comprise polyvinyl chloride and a tetrapolymer composition having the formula E/P/X/CO, which may include from 25 wt. % to 90 wt. % of ethylene (E), from 0.1 wt. % to 5.0 wt. % of propylene (P), from 5 wt. % to 40 wt. % of alkyl acrylate (X), and from 3 wt. % to 30 wt. % of carbon monoxide (CO). X may be selected from the group consisting of vinyl acetate or n-butyl acrylate. The tetrapolymer composition may have a melt index, $I_2$, from 10 to 1,000 g/10 min when measured according to ASTM 1238 at 2.16 kg and 190° C.

These and other embodiments are described in more detail in the following Detailed Description.

DETAILED DESCRIPTION

Specific embodiments of the present application will now be described. These embodiments are provided so that this disclosure will be thorough and complete and will fully convey the scope of the subject matter to those skilled in the art.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers and tetrapolymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "propylene-based polymer," as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

Reference will now be made in detail to embodiments of polymer compositions as described herein. Embodiments of the polymer compositions may include a tetrapolymer composition represented by the formula E/P/X/CO, which includes polymer units E, P, X, and CO. According to at least one embodiment of the present disclosure, the tetrapolymer composition may have the formula E/P/X/CO, which may include from 25 wt. % to 90 wt. % of ethylene (E), from 0.1 wt. % to 5.0 wt. % of propylene (P), from 5 wt. % to 40 wt. % of alkyl acrylate (X), and from 3 wt. % to 30 wt. % of carbon monoxide (CO). X may be selected from the group consisting of vinyl acetate or n-butyl acrylate. The tetrapolymer composition may have a melt index, $I_2$, from 10 grams per 10 minutes (g/10 min) to 1,000 g/10 min when measured according to ASTM 1238 at 2.16 kg and 190° C.

In embodiments, E may be a polymer unit —$(CH_2CH_2)$— derived from ethylene monomer. The tetrapolymer composition may include from 25 wt. % to 90 wt. % of E based on the total weight of the tetrapolymer, from 25 wt. % to 80 wt. %, from 25 wt. % to 70 wt. %, from 25 wt. % to 60 wt. %, from 25 wt. % to 50 wt. %, from 25 wt. % to 40 wt. %, from 25 wt. % to 30 wt. %, from 30 wt. % to 90 wt. %, from 30 wt. % to 80 wt. %, from 30 wt. % to 70 wt. %, from 30 wt. % to 60 wt. %, from 30 wt. % to 50 wt. % from 30 wt. % to 40 wt. %, from 40 wt. % to 90 wt. %, from 40 wt. % to 80 wt. %, from 40 wt. % to 70 wt. %, from 40 wt. % to 60 wt. %, from 40 wt. % to 50 wt. %, from 50 wt. % to 90 wt. %, from 50 wt. % to 80 wt. %, from 50 wt. % to 70 wt. %, from 50 wt. % to 60 wt. %, from 60 wt. % to 90 wt. %, from 60 wt. % to 80 wt. %, from 60 wt. % to 70 wt. %, from 70 wt. % to 90 wt. %, from 70 wt. % to 80 wt. %, or from 80 wt. % to 90 wt. %.

In embodiments, P may be a polymer unit derived from propylene monomer. The tetrapolymer composition may include from 0.1 wt. % to 5 wt. % of P based on the total weight of the tetrapolymer, from 0.1 wt. % to 4 wt. %, from 0.1 wt. % to 3 wt. %, from 0.1 wt. % to 2 wt. %, from 0.1 wt. % to 1 wt. %, from 0.1 wt. % to 0.5 wt. %, from 0.5 wt. % to 5 wt. %, from 0.5 wt. % to 4 wt. %, from 0.5 wt. % to 3 wt. %, from 0.5 wt. % to 2 wt. %, from 0.5 wt. % to 1 wt. %, from 1 wt. % to 5 wt. % from 1 wt. % to 4 wt. %, from 1 wt. % to 3 wt. %, from 1 wt. % to 2 wt. %, from 2 wt. % to 5 wt. %, from 2 wt. % to 4 wt. %, from 2 wt. % to 3 wt. %, from 3 wt. % to 5 wt. %, from 3 wt. % to 4 wt. %, or from 4 wt. % to 5 wt. %.

In embodiments, X may be a polymer unit comprising an alkyl acrylate. In further embodiments, X may be a polymer unit selected from the group consisting of vinyl acetate or n-butyl acrylate monomers. The tetrapolymer composition may include from 5 wt. % to 40 wt. % of X based on the total weight of the tetrapolymer, from 5 wt. % to 35 wt. %, from 5 wt. % to 30 wt. %, from 5 wt. % to 25 wt. %, from 5 wt. % to 20 wt. %, from 5 wt. % to 15 wt. %, from 5 wt. % to 10 wt. %, from 10 wt. % to 40 wt. %, from 10 wt. % to 35 wt. %, from 10 wt. % to 30 wt. %, from 10 wt. % to 25 wt. %, from 10 wt. % to 20 wt. % from 10 wt. % to 15 wt. %, from 15 wt. % to 40 wt. %, from 15 wt. % to 35 wt. %, from 15 wt. % to 30 wt. %, from 15 wt. % to 25 wt. %, from 15 wt. % to 20 wt. %, from 20 wt. % to 40 wt. %, from 20 wt. % to 35 wt. %, from 20 wt. % to 30 wt. %, from 20 wt. % to 25 wt. %, from 25 wt. % to 40 wt. %, from 25 wt. % to 35 wt. %, from 25 wt. % to 30 wt. %, from 30 wt. % to 40 wt. %, from 30 wt. % to 35 wt. %, or from 35 wt. % to 40 wt. %.

In embodiments, CO may be a polymer unit derived from comonomers including carbon monoxide. The tetrapolymer composition may include from 3 wt. % to 30 wt. % of CO based on the total weight of the tetrapolymer, from 3 wt. % to 25 wt. %, from 3 wt. % to 20 wt. %, from 3 wt. % to 15 wt. %, from 3 wt. % to 10 wt. %, from 3 wt. % to 5 wt. %, from 5 wt. % to 30 wt. %, from 5 wt. % to 25 wt. %, from 5 wt. % to 20 wt. %, from 5 wt. % to 15 wt. %, from 5 wt. % to 10 wt. %, from 10 wt. % to 30 wt. % from 10 wt. % to 25 wt. %, from 10 wt. % to 20 wt. %, from 10 wt. % to 15 wt. %, from 15 wt. % to 30 wt. %, from 15 wt. % to 25 wt. %, from 15 wt. % to 20 wt. %, from 20 wt. % to 30 wt. %, from 20 wt. % to 25 wt. %, from 25 wt. % to 30 wt. %, or from 25 wt. % to 30 wt. %.

In embodiments, the tetrapolymer composition may have a melt index, $I_2$, from 10 grams/10 minutes (g/10 min) to 1,000 g/10 min when measured according to ASTM 1238 at 2.16 kg and 190° C., from 10 g/10 min to 800 g/10 min, from 10 g/10 min to 600 g/10 min, from 10 g/10 min to 400 g/10 min, from 10 g/10 min to 200 g/10 min, from 10 g/10 min to 100 g/10 min, from 10 g/10 min to 50 g/10 min, from 50 g/10 min to 1,000 g/10 min, from 50 g/10 min to 800 g/10 min, from 50 g/10 min to 600 g/10 min, from 50 g/10 min to 400 g/10 min, from 50 g/10 min to 200 g/10 min, from 50 g/10 min to 100 g/10 min, from 100 g/10 min to 1,000 g/10 min, from 100 g/10 min to 800 g/10 min, from 100 g/10 min to 600 g/10 min, from 100 g/10 min to 400 g/10 min, from 100 g/10 min to 200 g/10 min, from 200 g/10 min to 1,000 g/10 min, from 200 g/10 min to 800 g/10 min, from 200 g/10 min to 600 g/10 min, from 200 g/10 min to 400 g/10 min, from 400 g/10 min to 1,000 g/10 min, from 400 g/10 min to 800 g/10 min, from 400 g/10 min to 600 g/10 min, from 600 g/10 min to 1,000 g/10 min, from 600 g/10 min to 800 g/10 min, or from 800 g/10 min to 1,000 g/10 min.

In embodiments, the tetrapolymer composition may have a storage modulus of from 0.1 MPa to 100 MPa, from 0.1 MPa to 75 MPa, from 0.1 MPa to 50 MPa, from 0.1 MPa to 25 MPa, from 0.1 MPa to 1.0 MPa, from 1.0 MPa to 100 MPa, from 1.0 MPa to 75 MPa, from 1.0 MPa to 50 MPa, from 1.0 MPa to 25 MPa, from 25 MPa to 100 MPa, from 25 MPa to 75 MPa, from 25 MPa to 50 MPa, from 50 MPa to 100 MPa, from 50 MPa to 75 MPa, or from 75 MPa to 100 MPa. In other embodiments, the tetrapolymer composition may have a storage modulus of from 1.0 MPa to 10 MPa when measured according to ASTM D1708 at 20° C., from 1.0 MPa to 9.0 MPa, from 1.0 MPa to 8.0 MPa, from 1.0 MPa to 7.0 MPa, from 1.0 MPa to 6.0 MPa, from 1.0 MPa to 5.0 MPa, from 1.0 MPa to 4.0 MPa, from 1.0 MPa to 3.0 MPa, from 1.0 MPa to 2.0 MPa, from 2.0 MPa to 10.0 MPa, from 2.0 MPa to 9.0 MPa, from 2.0 MPa to 8.0 MPa, from 2.0 MPa to 7.0 MPa, from 2.0 MPa to 6.0 MPa, from 2.0 MPa to 5.0 MPa, from 2.0 MPa to 4.0 MPa, from 2.0 MPa to 3.0 MPa, from 3.0 MPa to 10.0 MPa, from 3.0 MPa to 9.0 MPa, from 3.0 MPa to 8.0 MPa, from 3.0 MPa to 7.0 MPa, from 3.0 MPa to 6.0 MPa, from 3.0 MPa to 5.0 MPa, from 3.0 MPa to 4.0 MPa, from 4.0 MPa to 10.0 MPa, from 4.0 MPa to 9.0 MPa, from 4.0 MPa to 8.0 MPa, from 4.0 MPa to 7.0 MPa, from 4.0 MPa to 6.0 MPa, from 4.0 MPa to 5.0 MPa, from 5.0 MPa to 10.0 MPa, from 5.0 MPa to 9.0 MPa, from 5.0 MPa to 8.0 MPa, from 5.0 MPa to 7.0 MPa, from 5.0 MPa to 6.0 MPa, from 6.0 MPa to 10.0 MPa, from 6.0 MPa to 9.0 MPa, from 6.0 MPa to 8.0 MPa, from 6.0 MPa to 7.0 MPa, from 7.0 MPa to 10.0 MPa, from 7.0 MPa to 9.0 MPa, from 7.0 MPa to 8.0 MPa, from 8.0 MPa to 10.0 MPa, from 8.0 MPa to 9.0 MPa, or from 9.0 MPa to 9.5 MPa.

In embodiments, the tetrapolymer composition may have a melting temperature of from 30° C. to 80° C., from 30° C. to 75° C., from 30° C. to 70° C., from 30° C. to 65° C., from 30° C. to 60° C., from 30° C. to 55° C., from 30° C. to 50° C., from 30° C. to 45° C., from 30° C. to 40° C., from 30° C. to 35° C., from 35° C. to 80° C., from 35° C. to 75° C., from 35° C. to 70° C., from 35° C. to 65° C., from 35° C. to 60° C., from 35° C. to 55° C., from 35° C. to 50° C., from 35° C. to 45° C., from 35° C. to 40° C., from 40° C. to 80° C., from 40° C. to 75° C., from 40° C. to 70° C., from 40° C. to 65° C., from 40° C. to 60° C., from 40° C. to 55° C., from 40° C. to 50° C., from 40° C. to 45° C., from 45° C. to 80° C., from 45° C. to 75° C., from 45° C. to 70° C., from 45° C. to 65° C., from 45° C. to 60° C., from 45° C. to 55° C., from 45° C. to 50° C., from 50° C. to 80° C., from 50° C. to 75° C., from 50° C. to 70° C., from 50° C. to 65° C., from 50° C. to 60° C., from 50° C. to 55° C., from 55° C. to 80° C., from 55° C. to 75° C., from 55° C. to 70° C., from 55° C. to 65° C., from 55° C. to 60° C., from 60° C. to 80° C., from 60° C. to 75° C., from 60° C. to 70° C., from 60° C. to 65° C., from 65° C. to 80° C., from 65° C. to 75° C., from 65° C. to 70° C., from 70° C. to 80° C., from 70° C. to 75° C., or from 75° C. to 80° C.

In embodiments, the tetrapolymer composition may have a crystallization temperature of from 20° C. to 70° C., from 20° C. to 65° C., from 20° C. to 60° C., from 20° C. to 55° C., from 20° C. to 50° C., from 20° C. to 45° C., from 20° C. to 40° C., from 20° C. to 35° C., from 20° C. to 30° C., from 20° C. to 25° C., from 25° C. to 70° C., from 25° C. to 65° C., from 25° C. to 60° C., from 25° C. to 55° C., from 25° C. to 50° C., from 25° C. to 45° C., from 25° C. to 40° C., from 25° C. to 35° C., from 25° C. to 30° C., from 30° C. to 70° C., from 30° C. to 65° C., from 30° C. to 60° C., from 30° C. to 55° C., from 30° C. to 50° C., from 30° C. to 45° C., from 30° C. to 40° C., from 30° C. to 35° C., from 35° C. to 70° C., from 35° C. to 65° C., from 35° C. to 60° C., from 35° C. to 55° C., from 35° C. to 50° C., from 35° C. to 45° C., from 35° C. to 40° C., from 40° C. to 70° C., from 40° C. to 65° C., from 40° C. to 60° C., from 40° C. to 55° C., from 40° C. to 50° C., from 40° C. to 45° C., from 45° C. to 70° C., from 45° C. to 65° C., from 45° C. to 60° C., from 45° C. to 55° C., from 45° C. to 50° C., from 50° C. to 70° C., from 50° C. to 65° C., from 50° C. to 60° C., from 50° C. to 55° C., from 55° C. to 70° C., from 55° C. to 65° C., from 55° C. to 60° C., from 60° C. to 70° C., from 60° C. to 65° C., or from 65° C. to 70° C.

In embodiments, the tetrapolymer composition may have a heat of fusion of from 10 J/g to 100 J/g, from 10 J/g to 90 J/g, from 10 J/g to 80 J/g, from 10 J/g to 70 J/g, from 10 J/g to 60 J/g, from 10 J/g to 50 J/g, from 10 J/g to 40 J/g, from 10 J/g to 30 J/g, from 10 J/g to 20 J/g, from 20 J/g to 100 J/g, from 20 J/g to 90 J/g, from 20 J/g to 80 J/g, from 20 J/g to 70 J/g, from 20 J/g to 60 J/g, from 20 J/g to 50 J/g, from 20 J/g to 40 J/g, from 20 J/g to 30 J/g, from 30 J/g to 100 J/g, from 30 J/g to 90 J/g, from 30 J/g to 80 J/g, from 30 J/g to 70 J/g, from 30 J/g to 60 J/g, from 30 J/g to 50 J/g, from 30 J/g to 40 J/g, from 40 J/g to 100 J/g, from 40 J/g to 90 J/g, from 40 J/g to 80 J/g, from 40 J/g to 70 J/g, from 40 J/g to 60 J/g, from 40 J/g to 50 J/g, from 50 J/g to 100 J/g, from 50 J/g to 90 J/g, from 50 J/g to 80 J/g, from 50 J/g to 70 J/g, from 50 J/g to 60 J/g, from 60 J/g to 100 J/g, from 60 J/g to 90 J/g, from 60 J/g to 80 J/g, from 60 J/g to 70 J/g, from 70 J/g to 100 J/g, from 70 J/g to 90 J/g, from 70 J/g to 80 J/g, from 80 J/g to 100 J/g, from 80 J/g to 90 J/g, or from 90 J/g to 100 J/g.

Embodiments of polymer formulations comprising the tetrapolymer composition will now be described. In embodiments, the polymer formulation comprising the tetrapolymer composition described herein may further include vinyl halide polymers. Vinyl halide polymers are homopolymers or copolymers of vinyl chloride or vinylidene dichloride. In embodiments, the polymer formulation comprising the tetrapolymer composition described herein, may further include poly(vinyl chloride) (PVC). Poly(vinyl chloride) polymers can be further classified as "rigid" PVC polymers or "flexible" PVC polymers by their degree of rigidity. Flexible PVC polymers may have a modulus less than 100,000 psi (690 MPa), and rigid PVC polymers may have may have a modulus greater than 100,000 psi (690 MPa), for example between 100,000 psi and 1,000,000 psi (690 MPa and 6,900 MPa). Flexible PVC polymers may be distinguished from rigid PVC polymers primarily by the presence of and amount of plasticizers in the resin. Flexible PVC polymers typically have improved processability, lower tensile strength and higher elongation than rigid PVC polymers. In embodiments, the polymer formulations described herein comprising the tetrapolymer composition and polyvinyl chloride may be classified as flexible PVC polymers. In some embodiments, the poly(vinyl chloride) polymers may have a K value from 60 to 80, from 60 to 75, from 60 to 70, from 60 to 65, from 65 to 80, from 65 to 75, from 65 to 70, from 70 to 80, from 70 to 75, or from 75 to 80.

In embodiments, the polymer formulation may include from 40 wt. % to 99 wt. % of polyvinyl chloride based on the total weight of the polymer formulation. In further embodiments, the polymer formulation may include from 40 wt. % to 95 wt. %, from 40 wt. % to 90 wt. %, from 40 wt. % to 80 wt. %, from 40 wt. % to 70 wt. %, from 40 wt. % to 60 wt. %, from 40 wt. % to 50 wt. %, from 50 wt. % to 99 wt. %, from 50 wt. % to 90 wt. %, from 50 wt. % to 80 wt. %, from 50 wt. % to 70 wt. %, from 50 wt. % to 60 wt. %, from 60 wt. % to 99 wt. %, from 60 wt. % to 90 wt. %, from 60 wt. % to 80 wt. %, from 60 wt. % to 70 wt. %, from 70 wt. % to 99 wt. %, from 70 wt. % to 90 wt. %, from 70 wt. % to 80 wt. %, from 80 wt. % to 99 wt. %, from 80 wt. % to 90 wt. %, and from 90 wt. % to 99 wt. %.

In such embodiments, the polymer formulation may include from 1 wt. % to 60 wt. %, from 1 wt. % to 50 wt. %, from 1 wt. % to 40 wt. %, from 1 wt. % to 30 wt. %, from 1 wt. %, from 1 wt. % to 20 wt. %, from 1 wt. % to 10 wt. %, from 10 wt. % to 60 wt. %, from 10 wt. % to 50 wt. %, from 10 wt. % to 40 wt. %, from 10 wt. % to 30 wt. %, from 10 wt. %, from 10 wt. % to 20 wt. %, from 20 wt. % to 60 wt. %, from 20 wt. % to 50 wt. %, from 20 wt. % to 40 wt. %, from 20 wt. % to 30 wt. %, from 30 wt. % to 60 wt. %, from 30 wt. % to 50 wt. %, from 30 wt. % to 40 wt. %, from 40 wt. % to 60 wt. %, from 40 wt. % to 50 wt. %, or from 50 wt. % to 60 wt. % of the tetrapolymer based on the total weight of the polymer formulation.

Without being bound by theory, it is believed that the tetrapolymer compositions described herein may be an efficient plasticizer when combined with polyvinyl chloride to produce the polymer formulation. The tetrapolymer composition may have an improved plasticizing efficiency, calculated according to methods described subsequently herein, when compared to other polymer compositions that may be combined with polyvinyl chloride. Accordingly, polymer formulations comprising embodiments of the tetrapolymer composition described may exhibit improved processability, lower tensile strength and higher elongation than conventional flexible PVC polymers that include other plasticizers. Furthermore, because the tetrapolymer compositions may have an improved plasticizing efficiency, the polymer formulations described herein may require relatively less plasticizer than conventional flexible PVC polymers that utilize other conventional polymeric plasticizers. The plasticizing efficiency of the tetrapolymer composition, as used herein, may be calculated as plasticizing efficiency relative to diisodecyl phthalate (DIDP), which is a conventional phthalate plasticizer. In embodiments, the tetrapolymer composition may have a plasticizing efficiency relative to DIDP of greater than 0.14, greater than 0.16, greater than 0.18 or greater than 0.20.

In further embodiments, the polymer formulation may further include other materials present to modify the properties of the polyvinyl chloride. These one or more optional components may include, but are not limited to, polystyrene, styrenic copolymers, polyolefins including homo and copolymers comprising polyethylene, and or polypropylene, and other ethylene/α-olefin copolymers, polyacrylic resins, butadiene-containing polymers such as acrylonitrile butadiene styrene terpolymers (ABS), and methacrylate butadiene styrene terpolymers (MBS), and chlorinated polyethylene (CPE) resins and the like. These one or more optional components may further include DIDP, epoxidized soybean oil (ESO), stearic acid, and stabilizers known in the art. Such stabilizers may include barium/zinc stabilizers and Irganox® 1076 stabilizer (commercially available from BASF).

In embodiments, the polymer formulation may include 1 wt. % to 40 wt. %, from 1 wt. % to 30 wt. %, from 1 wt. %, from 1 wt. % to 20 wt. %, from 1 wt. % to 10 wt. %, from 10 wt. % to 50 wt. %, from 10 wt. % to 40 wt. %, from 10 wt. % to 30 wt. %, from 10 wt. %, from 10 wt. % to 20 wt. %, from 20 wt. % to 50 wt. %, from 20 wt. % to 40 wt. %, from 20 wt. % to 30 wt. %, from 30 wt. % to 50 wt. %, from 30 wt. % to 40 wt. %, or from 40 wt. % to 50 wt. % of the one or more optional components based on the total weight of the polymer formulation.

To produce the polymer formulation, the tetrapolymer composition may be blended with the polyvinyl chloride and, optionally, the one or more additional components. In further embodiments, the one or more optional components and the polyvinyl chloride may be dry mixed separately from the tetrapolymer. In embodiments, one or more optional components and the polyvinyl chloride may be dry mixed in a "Henschel type" high speed mixer. Then, the dry blend of the one or more optional components and the polyvinyl chloride may be loaded into a polymer mixing device. In embodiments, the mixing device may be a Haake mixer, a co-rotating twin screw extruder, a counter rotating twin screw extruder, or a conical mixer. The Haake temperature may be set at melt temperature of from 100° C. to 200° C., from 100° C. to 180° C., from 100° C. to 160° C., from 100° C. to 140° C., from 100° C. to 120° C., from 120° C. to 200° C., from 120° C. to 180° C., from 120° C. to 160° C., from 120° C. to 140° C., from 140° C. to 200° C., from 140° C. to 180° C., from 140° C. to 160° C., from 160° C. to 200° C., from 160° C. to 180° C., or from 180° C. to 200° C. When the dry blend of the one or more optional components and the polyvinyl chloride are loaded into the Haake mixer, the melt temperature may drop. When the temperature of the Haake mixer climbs back to desired melt temperature, the tetrapolymer composition may be added into the Haake mixer. While mixing, the melt torque may be monitored to check the fusion of the PVC compounds to determine whether the fusion peak has been reached. As used herein, the fusion peak means the peak in a torque curve generated via software from the measured torque after the initial loading of the PVC dry blend. The fusion peak can be directly observed from the torque change. In some embodiments, once the fusion peak has been reached, the Haake mixer may continue mixing for additional time to ensure desired melt mixing. For example, the Haake mixer may continue mixing for an additional 1 minute to 60 minutes, 1 minute to 30 minutes, 1 minute to 10 minutes, 1 minute to 5 minutes, 5 minutes to 60 minutes, 5 minutes to 30 minutes, 5 minutes to 10 minutes, 10 minutes to 60 minutes, 10 minutes to 30 minutes, or 30 minutes to 60 minutes. The polymer formulation may be produced once the tetrapolymer, the polyvinyl chloride, and the optional one or more additional components have been sufficiently melt mixed.

In embodiments including the formation of plasticized PVC using a co-rotating twin extruder, a dry blend powder and tetrapolymer pellets may be fed using gravimetric feeders into the feed hopper of the extruder. The extruder may be equipped with two rotating screws, powder conveying sections, a melting and fusing section, and multiple mixing sections separated by melt conveying sections. As the mixture of dry blend powder and tetrapolymer pellets flows through the extruder, the powder and pellets melt and mix to produce a homogenous melt. A die plate may be attached to an end of the extruder through which the polymer melt flows as continuous strands. The continuous strands may be cut using rotating knives to produce plasticized PVC pellets. In embodiments, the melting and mixing section of the extruder may be set at a temperature from 140° C. to 200° C. In embodiments, the temperature of the melt exiting the die plate may be from 170° C. to 210° C. To test whether the PVC powder is completely plasticized, the PVC pellets may be pressed into a thin film in a compression molder and analyzed using a photo scanner in transmission mode. Upon complete and satisfactory plastification, the image will result in a percentage of white area<5%.

In one or more additional embodiments, the polymer formulations described herein may be formed into an article. Articles comprising the polymer formulations described herein may be utilized in flexible PVC applications, including roofing and geomembrane applications. Articles may include films and plaques that comprise the polymer formulations described herein.

Test Methods

Density

Samples for density measurement are prepared according to ASTM D4703. Measurements are made, according to ASTM D792, Method B, within one hour of sample pressing. Its value is reported in grams per cubic centimeter (g/cm$^3$).

Melt Index

Melt index, $I_2$, is measured in accordance to ASTM D-1238 at 190° C. and at 2.16 kg. Its values are reported in g/10 min.

Dynamic Mechanical Spectroscopy (DMS)

Viscosity measurements were conducted by the TA instrument ARES in a parallel plate Samples were compression molded at 190° C., for 6.5 minutes at pressure of 25000 lbs in air, and the plaques were subsequently allowed to cool down on lab bench. Plaque thickness was ~3 mm. Constant temperature frequency sweep measurements were performed on an ARES strain controlled parallel plate rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 180° C. The plates were then closed to 2 mm, the sample trimmed, and then the test was started. The method had an additional five minute delay built in, to allow for temperature equilibrium. The experiments were performed at 180° C. over a frequency range of 0.1-500 rad/s at five points per decade interval. The strain amplitude was constant at 5%. The stress response was analyzed in terms of amplitude and phase, from which the storage modulus (G'), loss modulus (G"), complex modulus (G*), dynamic complex viscosity ($\eta^*$), and tan ($\delta$) or tan delta were calculated. Also, thin plaques with the thickness around 3-4 mm of the samples were made to measure the tan delta (ratio of loss modulus and storage modulus) vs. temperature at from −100 to 80° C.

Tensile Properties

Tensile strength, tensile modulus and elongation at break were measured according to ASTM D1708. To test these properties, micro-tensile bars were punched out of compression molded plaques having a thickness of 2 mm Glass Transition Temperature (T)

Glass Transition Temperature (Tg) is measured from the tan delta peak temperature of the DMS analysis described herein.

Differential Scanning Calorimetry (DSC)

Differential Scanning Calorimetry (DSC) can be used to measure the melting, crystallization, heat of fusion, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 120° C. and held isothermal for 3 minutes in order to remove its thermal history. Next, the sample is cooled to −50° C. at a 10° C./minute cooling rate and held isothermal at −50° C. for 3 minutes. The sample is then heated to 120° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. The heat of fusion (Hf) (also known as melt enthalpy) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, The Basis of Thermal Analysis, in Thermal Characterization of Polymeric Materials 92, 277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

EXAMPLES

The following examples illustrate features of the present disclosure but are not intended to limit the scope of the disclosure. The following experiments analyzed the performance of embodiments of the polymer compositions described herein.

Example 1: Sample 1

To prepare Sample 1, a 545 milliliter (mL) stirred autoclave was charged with a mixture of ethylene (E), n-butyl acrylate (nBA), carbon monoxide (CO), and propylene. Organic peroxide (t-butyl peroctoate) as a 1 wt. % to 3 wt. % solution in odorless mineral spirits was added as a polymerization initiator to the mixture, which was subjected to a set pressure of approximately 27,000 psi (1,898 kg/cm$^2$). The reactor temperature was set to a target temperature of 205° C. Under the polymerization conditions shown in Table 1, the tetrapolymer was continuously synthesized and subsequently converted into pellet forms by melt extrusion. The conditions listed in Table 1 are averages over the time span that Sample 1 was collected. The "autoclave-made" experimental reactor tetrapolymer thus formed was found to have the characteristics set forth in Table 2.

TABLE 1

| Polymerization conditions of Sample 1. | |
| --- | --- |
| | Sample 1 |
| Reactor Pressure (psi) | 27,000 |
| Reactor Temp. (° C.) | 204.9 |
| Ethylene feed rate (lb/hr) | 24.96 |
| nBA feed rate (lb/hr) | 1.7 |
| CO feed rate (lb/hr) | 0.71 |
| Acetone Feed Rate (lb/hr) | — |
| Propylene feed rate (lb/hr) | 2.08 |
| Initiator solution wt. % | 3 |
| Initiator solution feed rate (cc/hr) | 30.18 |
| Reactor conversion (%) | 11.40% |

The properties of Sample 1 are provided in Table 2 below, where nBA represents n-butyl acrylate; CO represents carbon monoxide; P represents propylene; the weight percent of nBA, CO, and P are based on the total weight of Sample 1; and melt index is measured according to ASTM D-1238 at 190° C. and at 2.16 kg.

TABLE 2

| Properties of Sample 1. | | | | |
| --- | --- | --- | --- | --- |
| | wt. % E | wt. % nBA | wt. % CO | wt. % P | Melt Index (g/10 minutes) |
| Sample 1 | 58 | 29.9 | 9.6 | ~2.5 | 248 |

Example 2: Comparative Sample A

To prepare Sample 1, A 545 milliliter (mL) stirred autoclave was charged with a mixture of ethylene (E), n-butyl acrylate (nBA), carbon monoxide (CO), and acetone. Organic peroxide (t-butyl peroctoate) as a 1 wt. %-3 wt. % solution in odorless mineral spirits was added as a polymerization initiator to the mixture, which was subjected to a set pressure of approximately 27,000 psi (1,898 kg/cm$^2$). The reactor temperature was set to a target temperature of 205° C. Under the polymerization conditions shown in Table 3, the terpolymers were continuously synthesized and subsequently converted into pellet forms by melt extrusion. The conditions listed in Table 2 are averages over the time span that Comparative sample A was collected. The "autoclave-made" experimental reactor terpolymer thus formed was found to have the characteristics set forth in Table 3.

TABLE 3

| Polymerization conditions of Comparative Sample A. | |
| --- | --- |
| | Comparative Sample A |
| Reactor Pressure (psi) | 27,000 |
| Reactor Temp. (° C.) | 205 |
| Ethylene feed rate (lb/hr) | 25 |
| nBA feed rate (lb/hr) | 1.7 |
| CO feed rate (lb/hr) | 0.68 |
| Acetone Feed Rate (lb/hr) | 2.21 |
| Propylene feed rate (lb/hr) | — |
| Initiator solution wt. % | 1 |
| Initiator solution feed rate (cc/hr) | 33.25 |
| Reactor conversion (%) | 12.30% |

The properties of Comparative Sample A are provided in Table 4 below, where nBA represents n-butyl acrylate; CO represents carbon monoxide; P represents propylene; the weight percent of nBA, CO, and P are based on the total weight of Comparative Sample A; and melt index is measured according to ASTM D-1238 at 190° C. and at 2.16 kg.

TABLE 4

| Properties of Sample 1. | | | | |
| --- | --- | --- | --- | --- |
| | wt. % E | wt. % nBA | wt. % CO | wt. % P | Melt Index (g/10 minutes) |
| Comparative Sample 1 | 60.4 | 29.5 | 10.1 | — | 243 |

Example 3: Comparison of Sample 1 and Comparative Sample A

In Example 3, Sample 1 and Comparative Sample A were compared by analyzing melt index, molecular weight, molecular weight distribution, glass transition temperature (Tg) (DSC), glass transition temperature (from tan delta peak), melting temperature, crystallization temperature, heat of fusion, and storage modulus at 20° C., which are subsequently provided in Table 5. These properties were measured according to the test methods described herein. To determine glass transition temperature (from tan delta peak), a plot of Tan(delta) versus Temperature was plotted, and the peak temperature is provided in the following table.

TABLE 5

| Comparison of Sample 1 and Comparative Sample A. | | |
| --- | --- | --- |
| | Comparative Sample A | Sample 1 |
| Composition | E-nBA-CO (60%-30%-10%) | E-P-nBA-CO (58%-2%-30%-10%) |
| MI | 250 | 250 |
| MW | 47,928 | 50,043 |
| MWD | 6.4 | 6.8 |
| Tg (DSC) | −46.9 C | −48.1 C |
| Tg (tan delta peak) | ~−40° C. | ~−40° C. |
| Tm | 61.3 C | 47.0 C |
| Tc | 44.1 C | 28.5 C |
| Heat of Fusion | 48.7 J/g | 34.7 J/g |
| Storage Modulus @ 20° C. (MPa) | 4.6 | 1.8 |

As shown in Table 5, when compared to Comparative Sample A, Sample 1 exhibited lower melting temperature, crystallization temperature, and heat of fusion. Additionally, Sample 1 exhibited a lower storage modulus for temperatures higher than −50° C. Lower storage modulus and thermal properties are desirable for plasticized PVC applications as flexibility is needed for processing, handling and installation of the finished article.

Example 4: Sample PVC-1

In Example 4, a PVC formulation, referred to as Sample PVC-1, was prepared that included polyvinyl chloride and Sample 1 of Example 1 described above. The materials used to produce Sample PVC-1 are polyvinyl chloride having a K value of 70 (sourced from Formosa Plastics Corporation); diisodecyl phthalate (DIDP) (sourced from ExxonMobil); a Barium/Zinc stabilizer (sourced from Galata Chemicals); epoxidized soybean oil (ESO) (sourced from Galata Chemicals); titanium dioxide (sourced from Chemours); stearic acid (sourced from Sigma-Aldrich); and Irganox® 1076 stabilizer (sourced from BASF). The amounts of each component in Sample PVC-1 are provided subsequently in Table 6.

TABLE 6

| Composition of Samples PVC-1 and PVC-2. | | |
| --- | --- | --- |
| Parts by weight per 100 PVC | Sample PVC-1 | Sample PVC-2 |
| PVC (K = 70) | 100 | 100 |
| Sample 1: E-P-nBA-CO (58%-2%-30%-10%) | 60 | 60 |
| DIDP | 15 | 0 |
| Ba/Zn stabilizer | 3 | 3 |
| ESO | 5 | 5 |
| TiO₂ | 15 | 15 |
| Stearic acid | 0.3 | 0.3 |
| Irganox ® 1076 | 0.2 | 0.2 |

To produce the Samples PVC-1 and PVC-2, all of the components except for the Sample 1 composition were dry mixed in a "Henschel type" high speed mixer. Then the dry blend was loaded into a Haake mixer (the Sample 1 composition). The Haake temperature was set at 170° C., and the melt temperature would drop once the PVC dry blend was added. Once the melt temperature climbed back to 170° C., the Sample 1 composition was then slowly added into the Haake mixer. The melt torque was closely monitored to check the fusion of the PVC compounds. Once the fusion peak was reached as determined according to the methods described herein, the Haake mixer was kept running for another 10 minutes to ensure good melt mixing. Then, each of Samples PVC-1 and PVC-2 were then taken out of the Haake and hot pressed at 185° C. into plaques of 2-4 nm for various characterization.

Example 5: Sample PVC-1a

In Example 5, a PVC formulation, similar to PVC-1 and referred to as Sample PVC-1a, was prepared using an alternative process as compared to Example 4. In particular, Sample PVC-1a included polyvinyl chloride dry powder having the same composition as the polyvinyl chloride of Example 4 and tetrapolymer pellets having the same composition as Sample 1 of Example 1 described above. PVC dry blend powder and tetrapolymer pellets were fed into a 26 mm Coperion co-rotating twin screw extruder having 11 barrels with a total length/diameter ratio of 44. The extruder had a relatively higher intensity screw design with one melting section of 4.8 length/diameter and two mixing sections of approximately 4.8 length/diameter and approximately 3.4 length/diameter, respectively. The PVC dry blend powder was fed using a KTRON gravimetric powder feeder and the tetrapolymer pellets were fed using a KTRON gravimetric pellet feeder. The extruder was equipped with a die having four 3.1 mm die holes. The continuous polymer strands were cut into pellets. The third through eleventh extruder barrels were set at a temperature of 160° C., the second barrel was set at 80° C., and no heating was applied to the feed barrel.

Table 7 below shows the processing parameters for the extrusion process to obtain Sample PVC-1a and the white area percentage of the resulting film. As evidenced by a percentage of white area of 0.47%, the processing described in Example 5 resulted in the complete and satisfactory plastification of the PVC powder.

TABLE 7

| Processing parameters for extrusion process to obtain Sample PVC-1A | |
|---|---|
| Throughput rate (lb/hr) | 35 |
| Extruder screw speed (rpm) | 300 |
| Melt temperature (° C.) | 198 |
| Specific energy input (kW-hour/kg) | 0.248 |
| Percentage of white area (%) | 0.47 |

4 g of the resulting pellets were compression molded into a thin film using a Carber press at a pressure of 10,000 psi and a temperature of 180° C. for 3 min. The film was cooled down to room temperature while held at a pressure of 10,000 psi and then removed from the press.

The resulting PVC film was scanned using an Epson Perfection Photo Scanner in reflection mode with an image size of 22 mm×22 mm at 4800 dip and save in 8 bit gray scale. The obtained image was then opened in Image J software and supplicated tice to obtain Image Copy 1 and Image Copy 2. A Gaussian Blur was applied to Image Copy 2 sigma (radius) of 40. The Image Calculator was used to subtract Image Copy 2 from Image Copy 1. Unsharp Mask was applied to the resultant image Radius (Sigma) of 2 pixels Mask Weight 0.80. A threshold default grey level 56 was applied next. The subsequent step was to dilate and then apply Median Filter Radius 2 pixels. Particle sizes were analyzed for the size range of 25 $\mu m^3$ to infinity $\mu m^3$. Then, the output of the white area percentage was tabulated using Microsoft Excel.

Example 6: Comparative Sample PVC-A

In Example 6, a composition referred to as Comparative Sample PVC-A was prepared including polyvinyl chloride and Sample 1 of Example 1 described above. The materials used to produce Sample PVC-1 are polyvinyl chloride having a K value of 70 (sourced from Formosa Plastics Corporation); diisodecyl phthalate (DIDP) (sourced from ExxonMobil); a Barium/Zinc stabilizer (sourced from Galata Chemicals); epoxidized soybean oil (ESO) (sourced from Galata Chemicals); titanium dioxide (sourced from Chemours); stearic acid (sourced from Sigma-Aldrich); and Irganox® 1076 stabilizer (sourced from BASF). The amounts of each component in Sample PVC-1 are provided subsequently in Table 8.

TABLE 8

| | Compositions of Comparative Samples PVC-A, PVC-B, and PVC-C. | | |
|---|---|---|---|
| Parts by weight per 100 PVC | Comparative Sample PVC-A | Comparative Sample PVC-B | Comparative Sample PVC-C |
| PVC (K = 70) | 100 | 100 | 100 |
| Comparative Sample A | 60 | 60 | 0 |
| DIDP | 15 | 0 | 60 |
| Ba/Zn stabilizer | 3 | 3 | 3 |
| ESO | 5 | 5 | 5 |
| TiO$_2$ | 15 | 15 | 15 |
| Stearic acid | 0.3 | 0.3 | 0.3 |
| Irganox ® 1076 | 0.2 | 0.2 | 0.2 |

To produce the Comparative Samples PVC-A, PVC-B, and PVC-C, all of the components except for the Sample 1 composition were dry mixed in a "Henschel type" high speed mixer. Then the dry blend was loaded into a Haake mixer (the Sample 1 composition). The Haake temperature was set at 170° C., and the melt temperature would drop once the PVC dry blend was added. Once the melt temperature climbed back to 170° C., the Sample 1 composition was then slowly added into the Haake mixer. The melt torque was closely monitored to check the fusion of the PVC compounds. Once the fusion peak was reached as determined according to the methods described herein, the Haake mixer was kept running for another 10 minutes to ensure good melt mixing. Then, each of Samples PVC-1 and PVC-2 were then taken out of the Haake and hot pressed at 185° C. into plaques with thickness between 2-4 mm for various characterization.

Example 7: Comparison of Sample PVC-1 and Comparative Sample PVC-A

In Example 7, the mechanical properties and plasticizing efficiencies were compared for Samples PVC-1 and PVC-2 and Comparative Samples PVC-A, PVC-B, and PVC-C. As provided in Examples 4 and 6 above, Samples PVC-1 and PVC-2 included the Sample 1 composition from Example 1 (E-P-nBA-CO (58%-2%-30%-10%)). Additionally, PVC-1 included DIDP. Comparative Samples PVC-A and PVC-B included the Comparative Sample A composition from Example 2 (E-nBA-CO (60%-30%-10%)). Additionally, PVC-A included DIDP. Comparative Sample PVC-C included only DIDP with neither the Sample 1 composition from Example 1 nor the Sample A composition from Example 2.

The mechanical properties of Samples PVC-1 and PVC-2 with Comparative Samples PVC-A, PVC-B, and PVC-C were measured according to the test methods provided herein. The tensile strength, tensile modulus and elongation at break were measured according to ASTM D1708. To test the samples, micro-tensile bars were punched out of the compression molded plaques made from the sample composition. The compression molded plaques had a thickness of 1.5 mm The viscosity and DMA characteristics of Samples PVC-1 and PVC-2 with Comparative Samples PVC-A, PVC-B, and PVC-C were measured according to the test methods provided herein. Viscosity measurements were conducted by the TA instrument ARES in a parallel plate configuration. Samples were tested at 180° C. with a strain of 5% and the frequency sweep was from 0.1 to 500 rad/s. Also, plaques with a thickness of 3-4 mm of the samples were made to measure the tan delta (ratio of loss modulus and storage modulus) vs. temperature at from −100 to 80° C.

The mechanical properties of Samples PVC-1 and PVC-2 and Comparative Samples PVC-A, PVC-B, and PVC-C provided subsequently in Table 9.

TABLE 9

Mechanical properties of Samples PVC-1 and PVC-2
and Comparative Samples PVC-A, PVC-B, and PVC-C.

|  | Modulus (MPa) | Tensile Strength (MPa) | Elongation at Break (%) |
|---|---|---|---|
| Sample PVC-1 | 18.1 | 12.7 | 348.3 |
| Sample PVC-2 | 47.9 | 16.2 | 314.1 |
| Comparative Sample PVC-A | 29.1 | 13.7 | 310.9 |
| Comparative Sample PVC-B | 106.1 | 14.2 | 251.6 |
| Comparative Sample PVC-C | 13.4 | 18.0 | 380.4 |

As shown in Table 9, it was observed that Sample PVC-1 exhibited comparable results to the DIDP-only sample, Comparative Sample PVC-C. Also, Sample PVC-1 and Comparative Sample PVC-A exhibited comparable tensile strength and elongation at break, but Sample PVC-1 exhibited lower modulus. Additionally, Sample PVC-2 and Comparative Sample PVC-B exhibited comparable tensile strength, but Sample PVC-1 exhibited lower modulus. As stated previously in this disclosure, for some flexible PVC applications, such as roofing applications, a lower modulus is desirable as it indicates higher softness and flexibility.

To calculate the modulus for each of PVC-1 and PVC-A, the following equations were used:

For Sample PVC-1:

$$\log_{10}(\text{Modulus of Overall Sample PVC-1}) = \log_{10}(\text{Modulus of Sample 1})^*(\text{wt. \% Sample 1 used in PVC-1}) + \log_{10}(\text{Modulus of PVC with other additives in PVC-1})^*(\text{wt. \% PVC with other additives in PVC-1})$$

For Comparative Sample PVC-A:

$$\log_{10}(\text{Modulus of Overall Sample PVC-A}) = \log_{10}(\text{Modulus of Sample 2})^*(\text{wt. \% Sample 2 used in PVC-A}) - \log_{10}(\text{Modulus of PVC with other additives in PVC-A})^*(\text{wt. \% PVC with other additives in PVC-A})$$

The moduli of Sample 1 and Comparative Sample A were based on the DMA data from Example 3 above. Using the equations above, the modulus (measured by the tensile test) of overall Sample PVC-A or overall Sample PVC-1 was used to back calculate the modulus of the polyvinyl chloride having a K value of 70 (sourced from Formosa Plastics Corporation) and other additives without Comparative Sample A or Sample 1, respectively. According to the formulation, it is known that the polyvinyl chloride having a K value of 70 (sourced from Formosa Plastics Corporation) with the other additives without Comparative Sample A or Sample 1 in Sample PVC-1 and Sample PVC-A is the same. Therefore, assuming the modulus of the polyvinyl chloride having a K value of 70 with other additives in PVC-1 equals the modulus of polyvinyl chloride having a K value of 70 with other additives in PVC-A the modulus of PVC-1 and Comparative PVC-A could be calculated and compared to the actual measured value.

TABLE 10

Mechanical properties of Sample PVC-1
and Comparative Sample PVC-A.

|  | Comparative Sample PVC-A | Sample PVC-1 |
|---|---|---|
| Modulus of Sample 1 (MPa, from DMA) | — | 1.8 |
| Modulus of Comparative Sample A (MPa, from DMA) | 4.6 | — |
| Weight % of Sample 1 in PVC-1 | — | 30 wt. % |
| Weight % of Comparative Sample A in PVC-A | 30 wt. % | — |
| Modulus of PVC within PVC-A or PVC-1, back-calculated (MPa) | 64 | 64 |
| Weight % of PVC within PVC-A or PVC-1 | 70% | 70% |
| Modulus of the overall Sample, Calculated (MPa) | 29.1 | 21.9 |
| Modulus of the overall Sample, Measured (MPa) | 29.1 | 18.1 |
| Tg of the overall Sample (° C.) | 5° C. | 0° C. |

As shown in Table 10, it was concluded the calculated modulus of Sample PVC-1 was higher than its value actually measured. This indicated that the low modulus of the Sample PVC-1 was not merely from the lower modulus of Sample 1 (of Example 1 above), which may further imply that Sample 1 has improved plasticizing efficiency with PVC, resulting in a lower modulus for the overall PVC formulation.

Furthermore it was observed that Sample PVC-1 exhibited a lower Tg and the Tg peak was broader, when compared to Comparative Sample PVC-A. Without being bound by theory, the lower glass transition temperature may contribute to why Sample PVC-1 exhibited lower modulus. Furthermore, the lower Tg of Sample PVC-1 may further illustrate that Sample 1 contributed to improved plasticizing efficiency with PVC.

To demonstrate that Sample 1 (of Example 1 above) exhibited improved plasticizing efficiency with PVC compared to Comparative Sample A (of Example 2 above), the plasticizing efficiencies (PE) relative to DIDP of Sample 1 and Comparative Sample A were calculated based on the following equations:

$$\text{PE of Sample 1} = (\text{Modulus of PVC-C})/(\text{Modulus of PVC-2})$$

$$\text{PE of Comparative Sample A} = (\text{Modulus of PVC-C})/(\text{Modulus of PVC-B})$$

The calculated plasticizing efficiencies, relative to DIDP, based on the equations above and the measured moduli of Comparative Sample PVC-C and Sample PVC-B or Comparative Samples PVC-B are provided in Table 11.

TABLE 11

Plasticizing efficiencies of Sample 1 and Comparative Sample A.

|  | Composition | MI | Plasticizing Efficiency (relative to DIDP) |
|---|---|---|---|
| Sample 1 | E-P-nBA-CO (58%-2%-30%-10%) | 250 | 0.28 |
| Comparative Sample A | E-nBA-CO (60%-30%-10%) | 250 | 0.13 |

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A tetrapolymer composition comprising:

the formula E/P/X/CO;

wherein:

E comprise from 25 wt. % to 90 wt. % of ethylene,

P comprises from 0.1 wt. % to 5.0 wt. % of propylene,

X comprises from 5 wt. % to 40 wt. % of an alkyl acrylate, and

CO comprises from 3 wt. % to 30 wt. % of carbon monoxide, and wherein the tetrapolymer composition has a melt index, $I_2$, from 10 to 1,000 g/10 min when measured according to ASTM 1238 at 2.16 kg and 190° C.

2. The tetrapolymer composition of claim 1, wherein the tetrapolymer composition has a melt index, $I_2$, of from 10 g/10 min to 800 g/10 min when measured according to ASTM 1238 at 2.16 kg and 190° C.

3. The tetrapolymer composition of claim 1, wherein the tetrapolymer composition has a melt index, $I_2$, of from 50 g/10 min to 600 g/10 min when measured according to ASTM 1238 at 2.16 kg and 190° C. of.

4. The tetrapolymer composition of claim 1, wherein the tetrapolymer comprises from 1 wt. % to 4 wt. % of P based on the total weight of the tetrapolymer.

5. The tetrapolymer composition of claim 1, wherein the tetrapolymer comprises from 10 wt. % to 40 wt. % of X based on the total weight of the tetrapolymer.

6. The tetrapolymer composition of claim 1, wherein the tetrapolymer comprises from 5 wt. % to 20 wt. % of CO based on the total weight of the tetrapolymer.

7. The tetrapolymer composition of claim 1, wherein the tetrapolymer composition has a storage modulus of from 0.1 MPa to 100 MPa when measured at 20° C.

8. The tetrapolymer composition of claim 1, wherein the tetrapolymer composition has a melting temperature of from 30° C. to 80° C.

9. The tetrapolymer composition of claim 1, wherein the tetrapolymer composition has a crystallization temperature of from 20° C. to 70° C.

10. The tetrapolymer composition of claim 1, wherein the tetrapolymer composition has a heat of fusion of from 10 J/g to 100 J/g.

11. The tetrapolymer composition of claim 1, wherein the tetrapolymer composition has a storage modulus of from 1.0 MPa to 4.5 MPa when measured at 20° C.

12. A polymer formulation comprising the tetrapolymer composition of claim 1 and further comprising polyvinyl chloride.

13. The polymer formulation of claim 12, comprising from 1 wt. % to 60 wt. % of the tetrapolymer based on the total weight of the polymer formulation.

14. The polymer formulation of claim 12, comprising from 40 wt. % to 99 wt. % of the polyvinyl chloride based on the total weight of the polymer formulation.

15. An article comprising the polymer formulation of claim 12.

* * * * *